(12) United States Patent
Golash et al.

(10) Patent No.: US 8,929,345 B2
(45) Date of Patent: Jan. 6, 2015

(54) METHOD AND SYSTEM FOR MANAGING DEVICES IN A WIRELESS NETWORK

(75) Inventors: Rahul Golash, Kondapur (IN); Rohit Shankar, Hyderabad (IN); Rajesh Dharmalingam, Trichy (IN); Srinivas Gudipudi, Hyderabad (IN)

(73) Assignee: CA, Inc., Islandia, NY (US)

( * ) Notice: Subject to any disclaimer, the term of this patent is extended or adjusted under 35 U.S.C. 154(b) by 2496 days.

(21) Appl. No.: 11/466,249

(22) Filed: Aug. 22, 2006

(65) Prior Publication Data

US 2008/0049686 A1 Feb. 28, 2008

(51) Int. Cl.
*H04W 4/00* (2009.01)
*H04L 29/08* (2006.01)
*H04L 29/12* (2006.01)
*H04W 4/02* (2009.01)

(52) U.S. Cl.
CPC ........ *H04L 67/125* (2013.01); *H04L 29/12783* (2013.01); *H04L 61/35* (2013.01); *H04W 4/02* (2013.01); *H04L 67/04* (2013.01); *H04L 67/18* (2013.01)
USPC ........... 370/338; 370/328; 370/349; 370/252; 370/254; 455/456.1; 455/457

(58) Field of Classification Search
None
See application file for complete search history.

(56) References Cited

U.S. PATENT DOCUMENTS

| | | | |
|---|---|---|---|
| 5,835,907 A | 11/1998 | Newman | |
| 6,452,915 B1 | 9/2002 | Jorgensen | |
| 6,504,526 B1 | 1/2003 | Mauritz | |
| 6,510,153 B1* | 1/2003 | Inoue et al. | 370/354 |
| 6,640,268 B1 | 10/2003 | Kumar | |
| 6,950,646 B2 | 9/2005 | Pradhan et al. | |
| 6,968,178 B2 | 11/2005 | Pradhan et al. | |
| 6,985,709 B2 | 1/2006 | Perets | |
| 7,088,727 B1 | 8/2006 | Short et al. | |
| 7,213,057 B2* | 5/2007 | Trethewey | 709/218 |
| 7,522,906 B2* | 4/2009 | Whelan et al. | 455/411 |
| 7,535,878 B2* | 5/2009 | Adrangi et al. | 370/338 |
| 2001/0016492 A1* | 8/2001 | Igarashi et al. | 455/433 |
| 2002/0031100 A1 | 3/2002 | Sashihara | |
| 2003/0067903 A1 | 4/2003 | Jorgensen | |
| 2003/0174658 A1 | 9/2003 | Kuo | |
| 2004/0002948 A1 | 1/2004 | Mantyjarvi et al. | |

(Continued)

FOREIGN PATENT DOCUMENTS

| | | |
|---|---|---|
| EP | 1 309 128 | 5/2003 |
| WO | WO 01/74011 | 10/2001 |
| WO | WO 2004/102999 | 11/2004 |

OTHER PUBLICATIONS

Harry Newton, "DHCP", Newton's Telecom Dictionary, Mar. 2003, CMP Books, 19th ed., p. 237.*

(Continued)

*Primary Examiner* — Willie J Daniel, Jr.
(74) *Attorney, Agent, or Firm* — Baker Botts L.L.P.

(57) ABSTRACT

According to one embodiment of the invention, a method for managing devices in a wireless network includes defining, by a managing device, assignment rules for geographic areas in the wireless network. The method also includes retrieving, by the managing device, device parameters from a device, the device located in a selected geographic area. The method further includes determining, by the managing device, the selected geographic area of the device by comparing the device parameters with the assignment rules. The method further includes displaying, by the managing device, the device in the selected geographic area.

22 Claims, 2 Drawing Sheets

(56) References Cited

U.S. PATENT DOCUMENTS

| | | |
|---|---|---|
| 2004/0029525 A1 | 2/2004 | Vertelney |
| 2005/0058067 A1 | 3/2005 | Chmaytelli et al. |
| 2005/0135286 A1 | 6/2005 | Nurminen et al. |
| 2005/0148345 A1* | 7/2005 | Kawai et al. ............... 455/456.3 |
| 2005/0259611 A1 | 11/2005 | Bhagwat et al. |
| 2006/0052121 A1 | 3/2006 | Suzuki et al. |
| 2006/0094456 A1 | 5/2006 | Rittle et al. |
| 2007/0109982 A1 | 5/2007 | Gudipudi et al. |
| 2007/0253343 A1* | 11/2007 | Malik ........................... 370/254 |

OTHER PUBLICATIONS

Yongguang Zhang et al.: "Intrusion Detection in Wireless Ad-Hoc Networks", Proceedings of the Annual International Conference on Mobile Computing and Networking, Aug. 2000, pp. 275-283, XP-002973484.

* cited by examiner

METHOD AND SYSTEM FOR MANAGING DEVICES IN A WIRELESS NETWORK

TECHNICAL FIELD OF THE INVENTION

This invention relates generally to wireless networks, and more particularly, to a method and system for managing devices in a wireless network.

BACKGROUND OF THE INVENTION

Conventional computer networks use wires or optical fibers as the common carrier medium. However, due to improved data rates and decreasing equipment prices, businesses are rapidly adopting wireless networks as a cost effective networking solution. Using wireless network technology, businesses can easily solve end user, or client, requests and provide immediate connectivity without having to install wiring as employees move within buildings or from building to building.

The augmentation of clients wishing to communicate in various wireless network environments has caused many wireless networking systems to respond by adding elements to accommodate the increase in traffic. As wireless networks grow in size and complexity, the management and control of these wireless networks becomes more difficult. Accordingly, it is generally desirable to provide an effective management and control mechanism in wireless networks.

OVERVIEW OF EXAMPLE EMBODIMENTS

According to one embodiment of the invention, a method for managing devices in a wireless network includes defining, by a managing device, assignment rules for geographic areas in the wireless network. The method also includes retrieving, by the managing device, device parameters from a device, the device located in a selected geographic area. The method further includes determining, by the managing device, the selected geographic area of the device by comparing the device parameters with the assignment rules. The method further includes displaying, by the managing device, the device in the selected geographic area.

Technical advantages of particular embodiments of the present invention include a method and system for managing devices in a wireless network that generates a visual display of devices according their location in a geographic area. Thus, an administrator of the wireless network can identify devices by geographic area.

Another technical advantage of particular embodiments of the present invention includes a method and system for managing devices in a wireless network that allows an administrator to control authorization of devices. Thus, an administrator can prevent unauthorized access to the wireless network.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 1A:
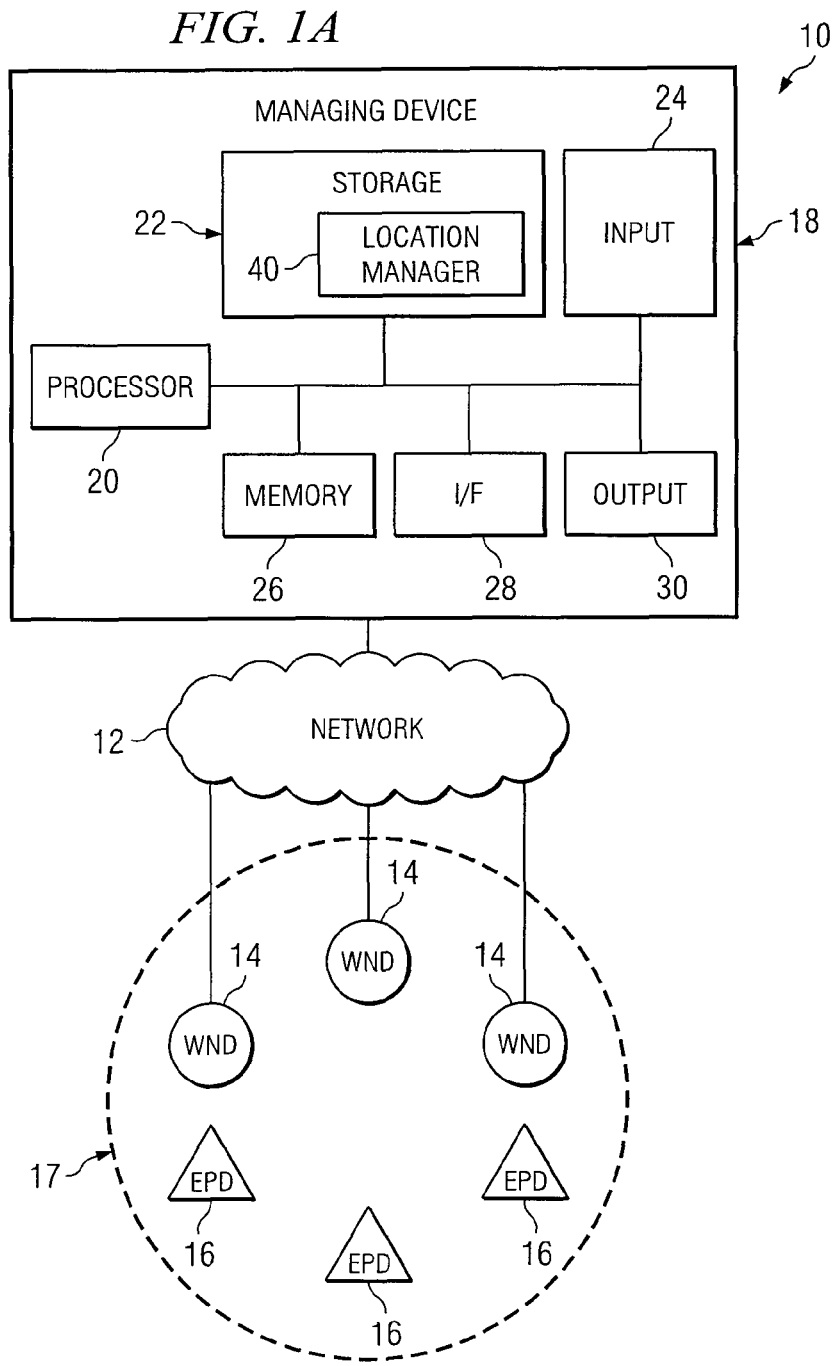
FIG. 1A illustrates a system that incorporates aspects of the present invention.
Figure 1B:
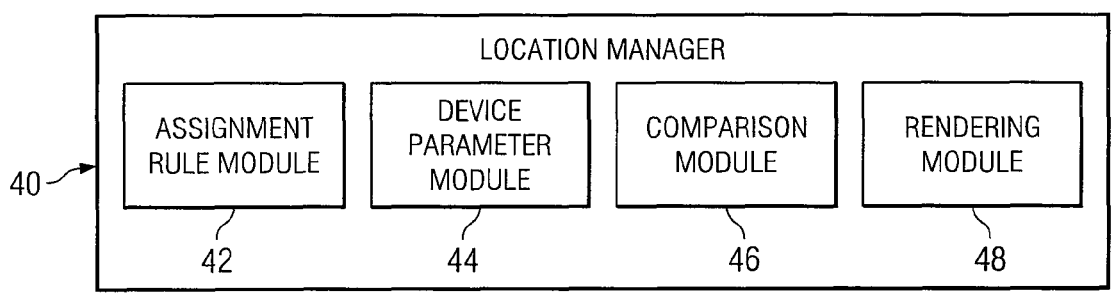
FIG. 1B illustrates an example location manager in accordance with an embodiment of the present invention.
Figure 2:
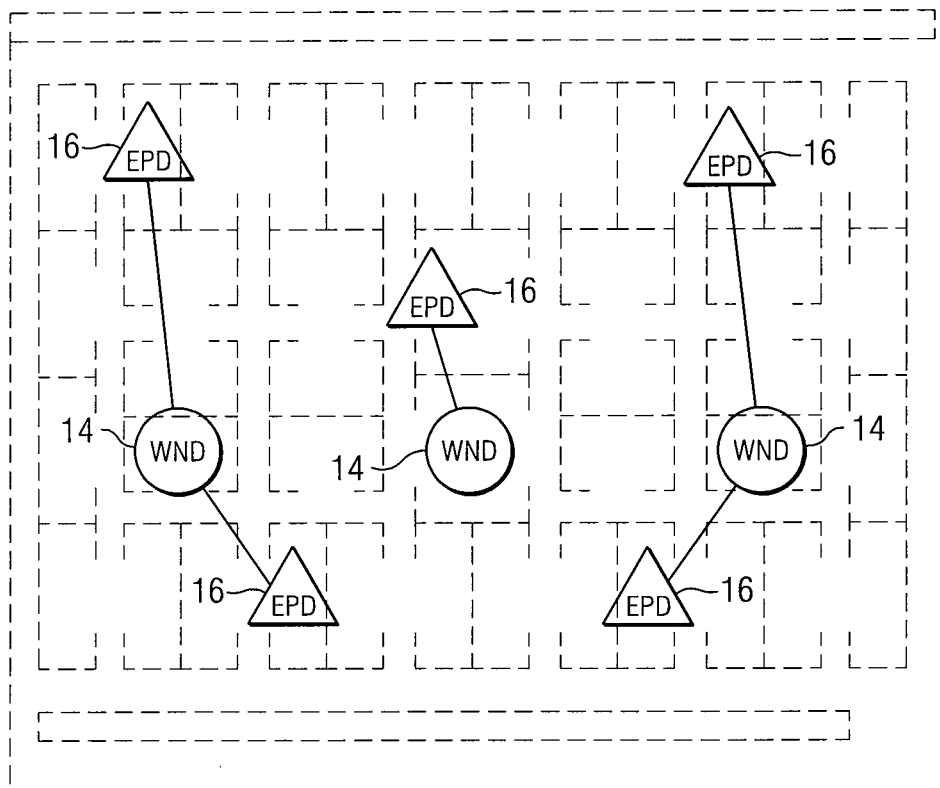
FIG. 2 is a simplified diagram of an example display of a wireless network in a geographic area.
Figure 3:
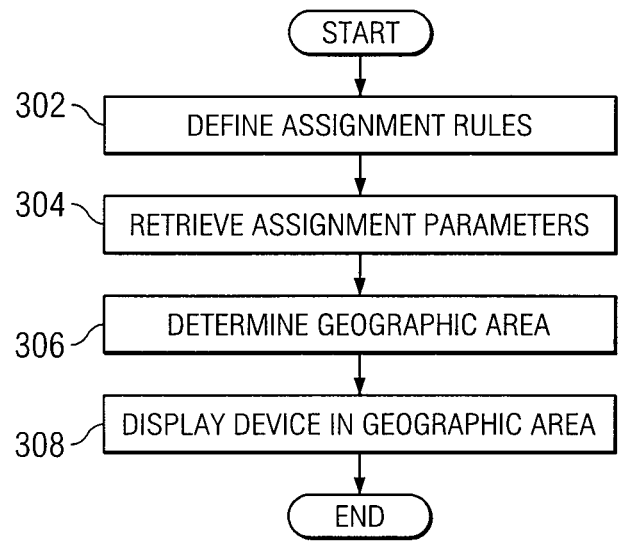
FIG. 3 is a flow diagram for managing devices in a wireless network.

Embodiments of the present invention and its advantages are best understood by referring to FIGS. 1 through 3 of the drawings, like numerals being used for like and corresponding parts of the various drawings.

FIG. 1A illustrates one embodiment of a system 10 for managing devices in a wireless network. As shown in FIG. 1A, system 10 generally includes a network 12, one or more wireless network devices 14, one or more endpoint devices 16, a wireless network range 17, and a managing device 18. System 10 is particularly adapted for displaying the locations of devices in a wireless network for purposes of network management.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Wireless network device 14 may be any network point suitable to couple an endpoint device, such as endpoint device 16, to a network, such as network 12. Wireless network device 14 may be, for example, a session border controller, gatekeeper, call manager, conference bridge, router, hub, switch, gateway, access point, edge point, or any other hardware or software operable to couple an endpoint device, such as endpoint device 16, to a network.

According to one embodiment of the invention, wireless network device 14 may have a wired connection to network 12. According to another embodiment of the invention, wireless network device 14 may have a wireless connection to network 12. According to yet another embodiment of the invention, wireless network device 14 may include a receiver or transmitter or both a receiver and a transmitter. As an example, wireless network device 14 may include an omni directional antenna operable to communicate with one or more endpoint devices.

Endpoint device 16 may refer to any suitable device operable to communicate with network 12 through a wireless network device 14. Endpoint device 16 may execute with any of the well-known MS-DOS, PC-DOS, OS-2, MAC-OS, WINDOWS™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through wireless network device 14.

Wireless network range 17 may refer to any suitable signal range for communications between wireless network device 14 and endpoint device 16. In particular embodiments of the invention, communications between wireless network device 14 and endpoint device 16 are communicated in wireless network range 17 according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPoL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Managing device 18 represents any device suitable to manage a device, such as wireless network device 14 or endpoint device 16, by displaying the device according to its location in a geographic area. Although FIG. 1A provides one example of managing device 18 as operating within network 12, in other embodiments managing device 18 may operate as a wireless device connecting to network 12 through a wireless network device 14. Additional details of one example of managing device 18 are described in more detail below.

In various embodiments of the invention, a wireless network may have devices, such as wireless network device 14 and endpoint device 16, located in various geographic areas. As the wireless network grows in size and complexity, the management and control of the wireless network becomes more difficult.

According to one embodiment of the invention, a system and method are provided that produce a visual display of devices according to their location in a geographic area. This is effected by comparing device parameters from a device with assignment rules for a geographic area and assigning the device to the proper geographic area for display by a managing device. Additional details of example embodiments of the invention are described in greater detail below in conjunction with portions of FIG. 1A, FIG. 1B, FIG. 2, and FIG. 3.

According to the illustrated embodiment of the invention, managing device 18 includes a processor 20, a storage device 22, an input device 24, a memory device 26, a communication interface 28, an output device 30, and a location manager 40.

Processor 20 may refer to any suitable device operable to execute instructions and manipulate data to perform operations for managing device 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Location manager 40 may refer to any suitable logic embodied in computer-readable media, and when executed, operable to define assignment rules, and assign devices to a determined geographic area for display. In the illustrated embodiment of the invention, location manager 40 resides in storage device 22. In other embodiments of the invention, location manager 40 may reside in memory device 26, or any other suitable device operable to store and facilitate retrieval of data and instructions.

FIG. 1B illustrates an example location manager 40 in accordance with an embodiment of the present invention. Location manager 40 may include various modules operable to perform various functions, including an assignment rule module 42, a device parameter module 44, a comparison module 46, and a rendering module 48.

According to one embodiment of the invention, assignment rule module 42 may define assignment rules for a geographic area. A geographic area may be a level of a site. A site may be a building or other physical structure. A level may be a floor, or other relative position in a site. The assignment rules defined by assignment rule module 42 may divide the levels of a site. For example, assignment rule module 42 may define a range of IP addresses for each level of a site. A first level may have an IP address range of 192.168.10.10 to 192.168.10.19, a second level may have an IP address range of 192.168.10.20 to 192.168.10.29, and so on. As another example, assignment rule module 42 may define a hostname regular expression for each level of a site. A first level may have a hostname regular expression of "firstlevel," a second level may have a hostname regular expression of "secondlevel," and so on. However, the present disclosure contemplates many types of levels and many types of assignment rules. Various embodiments may include, some, all, or none of the enumerated levels and assignment rules.

According to one embodiment of the invention, device parameter module 44 may retrieve device parameters from the device. For example, device parameter module 44 may retrieve an IP addresses as a device parameter. As another example, device parameter module 44 may retrieve a hostname as an device parameter. However, the present disclosure contemplates many types of device parameters. Various embodiments may include some, all, or none of the enumerated device parameters.

According to one embodiment of the invention, device parameter module 44 may send commands directly to devices to retrieve the device parameters directly from the devices. In other embodiments, device parameter module 44 may retrieve the device parameters from other sources, such as an application running on the network. Device parameter module 44 may retrieve data including device parameters learned about devices in a wireless network, and store the data in an appropriate storage medium, such as storage device 22.

According to one embodiment of the invention, comparison module 46 may compare the device parameters for a device with the assignment rules in order to determine a geographic area of the device. For example, if an assignment rule for a first level of a site specifies an IP address range of 192.168.10.1 to 192.168.10.9, and a device has an IP address of 192.168.10.5, then comparison module 46 may determine that the IP address of 192.168.10.5 is in the range of 192.168.10.1 to 192.168.10.9 and determine that the device is located in the first level. As another example, if an assignment rule for a second level specifies a hostname regular expression of "secondlevel," and a device has a hostname of "device1-secondlevel," then comparison module 46 may determine the regular expression "secondlevel" is in the hostname text "device1-secondlevel" and determine that the device is located in the second level.

According to one embodiment of the invention, rendering module 48 may assign a device, such as wireless network device 14 or endpoint device 16, to the determined geographic area for display. Rendering module 48 may display an entire wireless network of computers, peripheral equipment, operating systems and application programs in an environment that represents geographic areas. The display may be rendered using any suitable rendering engine. For example, the display may be rendered with a 2-D rendering engine. As another example, the display may be rendered using a 3-D rendering engine.

According to one embodiment of the invention, rendering module 48 may display a wireless network that spans several large areas and might contain various sites, a single site, a level of a site, a room on a level, and the computer related units in the room. For example, devices belonging to a first level may be displayed in a first-level display. Devices belonging to a second level may be displayed in a second-level display.

According to one embodiment of the invention, rendering module 48 may retrieve background data from a computer readable medium, such as storage device 22. The background data may be operable to display various enhancing effects. Enhancing effects may include, for example, maps such as geographic maps, topographical surfaces, floor plans, or any other suitable enhancing effect operable to provide more useful views and geographic area displays.

According to one embodiment of the invention, rendering module 48 may identify a physical location position of a device and display the device at the physical location. For example, rendering module 48 may assign devices to a level in a site, and identify a specific room or hallway where the device is located, and display the device accordingly.

According to one embodiment of the invention, rendering module 48 may identify a device type and display a device according to the identified device type. For example, rendering module 48 may determine that a device is a wireless network device 14, such as an access point, for example. Rendering module 48 may display wireless network device 14 as an access point. As another example, rendering module 48 may determine that a device is an endpoint device 16, such as a laptop, for example. Rendering module 48 may display endpoint device 16 as a laptop computer.

According to one embodiment of the invention, rendering module 48 may represent associations between devices such as wireless network device 14 and endpoint device 16, with any suitable display relationship. For example, if endpoint device 16 is connected to wireless network device 14, rendering module 48 may display a connector between wireless network device 14 and corresponding endpoint device 16, or other suitable association.

According to one embodiment of the invention, the devices monitored by location manager 40 may be monitored by agents on the devices. An agent may be any suitable logic operable to report to location manager 40 through managing device 18 whenever there is a significant status change to the device, and possibly on a regular basis to signify no changes. In various embodiments, location manager 40 may communicate with customizable agents on the devices. In other embodiments, location manager 40 may communicate using other protocols such as Simple Network Management Protocol (SNMP), thereby allowing third-party software agents and hardware devices to be managed.

FIG. 2 is a simplified diagram of an example display 200 of a wireless network in a geographic area. As shown in FIG. 2, display 200 generally includes a window 202, one or more endpoint devices 16, and one or more wireless network devices 14. Endpoint device 16 may be substantially similar to endpoint device 16 of FIG. 1A, and wireless network device 14 may be substantially similar to wireless network device 14 of FIG. 1A. In the illustrated embodiment, window 202 displays endpoint devices 16 and wireless network devices 14 on a level of a site.

According to one embodiment, window 202 may graphically display associations between endpoint devices 16 and wireless network devices 14. For example, if an endpoint device 16 is connected to wireless network device 14, location manager 40 may display a connecting line between the two devices. Displaying devices according to their geographic area, and displaying connecting lines between associated devices, provides an administrator with a real-time depiction of the wireless network.

According to one embodiment, window 202 may be displayed using any suitable visual area. For example, window 202 may be a window in a graphical application, a pop-up window, a dialog box, or any other suitable visual area operable to display a geographic area including devices in a wireless network. Additionally, the present disclosure contemplates many types of graphical displays to represent devices in a wireless network. Various embodiments may include some, all, or none of the enumerated displays.

FIG. 3 is a flow diagram illustrating example acts associated with managing devices in a wireless network. The example acts may be performed by location manager 40, as discussed above with reference to FIG. 1A and FIG. 1B. At step 302, assignment rules are defined in the device managing system. Assignment rules may be defined for a geographic area, such as a level of a site. Assignment rules may be defined to divide the levels of a site. For example, the device managing system may define a range of IP addresses as an assignment rule for each level of a site. A first level may have an IP address range of 192.168.10.10 to 192.168.10.19, a second level may have an IP address range of 192.168.10.20 to 192.168.10.29, and so on. Other embodiments may include, for example, a hostname regular expression as an assignment rule.

At step 304, device parameters may be retrieved from a device in the network. The device parameters may be retrieved directly from the devices. In other embodiments, the device parameters may be retrieved from other sources, such as another application running on the network. A knowledge base of device parameters learned about a device may be stored in an appropriate storage medium. In particular embodiments of the invention, the retrieved device parameters may include an IP addresses of a device. Other embodiments may include, for example, a hostname as an assignment parameter.

At step 306, a geographic area is determined by the device managing system. In particular embodiments of the invention, the device parameters for a device may be compared with the assignment rules for a geographic area in order to determine a geographic area for the device. For example, if an assignment rule for a first geographic area specifies an IP address range of 192.168.10.1 to 192.168.10.9, and a device has an IP address of 192.168.10.5, then because the IP address of 192.168.10.5 is in the range of 192.168.10.1 to 192.168.10.9, the device may be determined to be located in the first geographic area.

At step 308, the device is displayed in the determined geographic area. The wireless network display may include an entire wireless network of computers, peripheral equipment, operating systems and application programs in an environment that represents physical reality. The display may be rendered using any suitable rendering engine. For example, the display may be rendered with a 2-D rendering engine. As another example, the display may be rendered using a 3-D rendering engine.

The device managing system may display a wireless network that spans several large areas and might contain various buildings, a building, a level of a building, and a room and the computer related units in the room. For example, devices belonging to a first level may be displayed in a first-level display. Devices belonging to a second level may be displayed in a second-level display. Displaying devices according to their geographic area provides an administrator with a real-time depiction of the wireless network.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for managing devices in a wireless network, comprising:
    defining, by a managing device, a respective plurality of assignment rules for one or more geographic areas in a wireless network, the plurality of assignment rules comprising a rule indicative of an IP address range and a rule indicative of a hostname regular expression;
    retrieving, by the managing device, a plurality of device parameters from a device, the device located in a first geographic area of the one or more geographic areas, the plurality of device parameters comprising an IP address uniquely assigned to the device and a hostname regular expression assigned to the device;
    determining, by the managing device, that the device is located in the first geographic area by comparing the IP address uniquely assigned to the device and the hostname regular expression assigned to the device with the plurality of assignment rules of the first geographic area;
    retrieving, by the managing device, background data from a computer readable medium, the background data comprising a map of the first geographic area;
    identifying, by the managing device, a physical location of the device in the first geographic area; and
    displaying, by the managing device, the device in the identified physical location in the first geographic area.

2. A method for managing devices in a wireless network, comprising:
    defining, by a managing device, a respective plurality of assignment rules for one or more geographic areas in a wireless network;
    retrieving, by the managing device, a plurality of device parameters from a device, the device located in a first geographic area of the one or more geographic areas, the plurality of device parameters comprising an IP address uniquely assigned to the device and a hostname regular expression assigned to the device;
    determining, by the managing device, that the device is located in the first geographic area by comparing the IP address uniquely assigned to the device and the hostname regular expression assigned to the device with the plurality of assignment rules of the first geographic area; and
    displaying, by the managing device, the device in the first geographic area.

3. The method of claim 2, further comprising retrieving, by the managing device, background data from a computer readable medium, wherein the background data comprises a map of the first geographic area.

4. The method of claim 2, further comprising:
    identifying, by the managing device, a physical location of the device in the first geographic area; and
    displaying, by the managing device, the device in the identified physical location in the first geographic area.

5. The method of claim 2, wherein the plurality of assignment rules comprises a rule indicative of an IP address range.

6. The method of claim 2, wherein the plurality of assignment rules comprises a rule indicative of a hostname regular expression.

7. The method of claim 2, wherein the plurality of device parameters comprises a parameter indicative of the IP address uniquely assigned to the device.

8. The method of claim 2, wherein the plurality of device parameters comprises a parameter indicative of the hostname regular expression assigned to the device.

9. A system for managing devices in a wireless network, comprising:
    a wireless network, the wireless network comprising one or more devices; and
    a managing device operable to connect to the wireless network, the managing device comprising:
        a processor; and
        a storage device readable by the managing device, embodying a program of instructions operable when executed by the processor to:
            define a respective plurality of assignment rules for each of a plurality of geographic areas in the wireless network, the plurality of assignment rules comprising a rule indicative of an IP address range and a rule indicative of a hostname regular expression;
            retrieve a plurality of device parameters from a device, the device located in a first geographic area of the plurality of geographic areas, the plurality of device parameters comprising an IP address uniquely assigned to the device and a hostname regular expression assigned to the device;
            determine that the device is located in the first geographic area by comparing the IP address uniquely assigned to the device and the hostname regular expression assigned to the device with the plurality of assignment rules of the first geographic area; and
            display the device in the first geographic area.

10. The system of claim 9, wherein the acts further comprise retrieving background data from a computer readable medium, wherein the background data comprises a map of the first geographic area.

11. The system of claim 10, wherein the acts further comprise:
identifying a physical location of the device in the first geographic area; and
displaying the device in the identified physical location in the first geographic area.

12. The system of claim 10, wherein the plurality of assignment rules comprises a rule indicative of an IP address range.

13. The system of claim 10, wherein the plurality of assignment rules comprises a rule indicative of a hostname regular expression.

14. The system of claim 10, wherein the plurality of device parameters comprises a parameter indicative of the IP address uniquely assigned to the device.

15. The system of claim 10, wherein the plurality of device parameters comprises a parameter indicative of the hostname regular expression assigned to the device.

16. A non-transitory computer-readable medium encoded with logic, the logic being operable when executed to:
define, by a managing device, a respective plurality of assignment rules for each of a plurality of geographic areas in a wireless network, the plurality of assignment rules comprising a rule indicative of an IP address range and a rule indicative of a hostname regular expression;
retrieve, by the managing device, a plurality of device parameters from a device, the device located in a first geographic area of the plurality of geographic areas, the plurality of device parameters comprising an IP address uniquely assigned to the device and a hostname regular expression assigned to the device;
determine, by the managing device, that the device is located in the first geographic area by comparing the IP address uniquely assigned to the device and the hostname regular expression assigned to the device with the plurality of assignment rules of the first geographic area; and
display, by the managing device, the device in the first geographic area.

17. The non-transitory computer-readable medium encoded with logic of claim 16, the logic being further operable when executed to retrieve, by the managing device, background data from a computer readable medium, wherein the background data comprises a map of the first geographic area.

18. The non-transitory computer-readable medium encoded with logic of claim 16, the logic being further operable when executed to:
identify, by the managing device, a physical location of the device in the first geographic area; and
display, by the managing device, the device in the identified physical location in the first geographic area.

19. The non-transitory computer-readable medium encoded with logic of claim 16, wherein the plurality of assignment rules comprises a rule indicative of an IP address range.

20. The non-transitory computer-readable medium encoded with logic of claim 16, wherein the plurality of assignment rules comprises a rule indicative of a hostname regular expression.

21. The non-transitory computer-readable medium encoded with logic of claim 16, wherein the plurality of device parameters comprises a parameter indicative of the IP address uniquely assigned to the device.

22. The non-transitory computer-readable medium encoded with logic of claim 16, wherein the plurality of device parameters comprises a parameter indicative of the hostname regular expression assigned to the device.

* * * * *